United States Patent [19]

Maxwell

[11] 4,045,378

[45] Aug. 30, 1977

[54] USE OF HYDROQUINONE IN POLYURETHANE FOAMS CONTAINING HALOGENATED PHOSPHATE POLYESTER ADDITIVES

[75] Inventor: Clifford J. Maxwell, Milford, Conn.

[73] Assignee: Olin Corporation, New Haven, Conn.

[21] Appl. No.: 727,727

[22] Filed: Sept. 29, 1976

[51] Int. Cl.² .............................................. C08G 18/04
[52] U.S. Cl. ........................ 260/2.5 AJ; 260/2.5 AM
[58] Field of Search ................... 260/2.5 AJ, 2.5 AM

[56] References Cited

U.S. PATENT DOCUMENTS

| | | | |
|---|---|---|---|
| 3,096,314 | 7/1963 | Stevens et al. | 526/54 |
| 3,707,586 | 12/1972 | Turley | 260/2.5 AJ |
| 3,725,316 | 4/1973 | Jenkner | 260/2.5 AJ |
| 3,817,881 | 6/1974 | Turley | 260/2.5 AJ |

Primary Examiner—M. J. Welsh
Attorney, Agent, or Firm—William A. Simons; Thomas P. O'Day; F. A. Iskander

[57] ABSTRACT

Use of hydroquinone as a scorch inhibitor in polyurethane foams containing halogenated phosphate polyester additives.

20 Claims, No Drawings

USE OF HYDROQUINONE IN POLYURETHANE FOAMS CONTAINING HALOGENATED PHOSPHATE POLYESTER ADDITIVES

BACKGROUND OF THE INVENTION

A. Field of Invention

This invention relates to an improvement in the preparation of polyurethane foams whih contain halogenated phosphate polyester additives.

B. Description of the Prior Art

U.S. Pat. Nos. 3,707,586 and 3,817,881 teach that halogenated phosphate polyester additives can be added to polyurethane foam formulations to reduce the combustibility characteristics of the foam. Such polyurethane foams have gained increased acceptance in many commercial applications.

However, in some applications, especially with flexible foam formulations having a relatively high water concentration, the inclusion of these additives may cause scorching in the cured polyurethane foam bun. This scorching is characterized as a discoloration during the foaming and curing steps which, if severe, may cause structural weaknesses in the body of the foam. See U.S. Pat. No. 3,214,397 for a further description of this scorching problem.

BRIEF SUMMARY OF THE INVENTION

The present invention is directed to an improved method for making polyurethane foams which have reduced combustibility characteristics and also have no discoloration and/or structural weaknesses caused by scorching. Accordingly, this method comprises adding to a polyurethane foam formulation containing halogenated phosphate polyester additives an effective amount of hydroquinone to inhibit scorching.

DETAILED DESCRIPTION

Hydroquinone (also known as hydroquinol) in the present invention is added to polyurethane foam formulations in effective amounts to inhibit scorching from occurring in the foams during the curing or setting step. While it is not clear exactly how the hydroquinone acts in the foam, it is thought that this compound acts as a free radical inhibitor and prevents oxidation reactions from occurring in the curing step.

As employed herein in both the specification and claims attendant thereto, the term "inhibiting scorching" is defined as minimizing the visible discoloration caused by scorching on and in a polyurethane foam product so that a substantially uniform colored product is obtained.

For the present invention, halogenated phosphate polyesters can be employed which are represented by the formula

(I)

wherein
R is an aliphatic hydrocarbon radical having 1-8 carbon atoms, or an aromatic hydrocarbon radical having 6-14 carbon atoms,
X is a halogen selected from chlorine, bromine and a mixture thereof,
a is an integer of 0-4,
n is an integer of 2-6, and
each
R' is independently a haloalkyl radical having 1-8 carbon atoms, the halogen in this radical being chlorine, bromine or a mixture thereof.

These polyesters and their preparation are described in U.S. Pat. Nos. 3,707,586 and 3,817,881, which issued to Richard J. Turley on Dec. 26, 1972 and June 18, 1974, respectively.

Preferred polyesters for use according to the invention are those of Formula I above wherein R represents an aliphatic hydrocarbon radical having 1-8 carbon atoms, all the radicals represented by R' are identical and n is 2. Furthermore, it is generally more preferred to treat those polyesters of Formula I wherein all the halogens are chlorine, i.e., X is chlorine and all the radicals represented by R' are chloroalkyl.

Illustrative of the preferred polyesters are the following:
tetrakis(2-chloroethyl)ethylene diphosphate
tetrakis(2-chloroisopropyl)ethylene diphosphate
tetrakis(2-chloroethyl)p-phenylene diphosphate
tetrakis(2-chloroethyl)m-phenylene diphosphate
tetrakis(2-chloroethyl)tetrachloro-p-phenylene diphosphate
tetrakis(2-bromoethyl)ethylene diphosphate
tetrakis(2-chloroethyl)-2-butene-1,4-diphosphate
tetrakis(2-chloroethyl)-2,3-dibromobutylene-1,4-diphosphate
tetrakis(2-bromoisopropyl)ethylene diphosphate
2,2-bis(chloromethyl)-1,3-propylene-bis [bis(2-chloroethyl) phosphate]
2,2-bis(chloromethyl)-1,3-propylene-bis [bis(2-bromoethyl) phosphate ]
2,2-bis(chloromethyl)-1,3-propylene-bis [bis(2-chloropropyl) phosphate]
2,2-bis(bromomethyl)-1,3-propylene-bis [bis(2-bromomethyl) phosphate] 2,2-bis(bromoethyl)-1,3-propylene-bis [bis(2-chloroethyl) phosphate]
tetrakis(2,3-dichloropropyl)ethylene diphosphate
tetrakis(2,3-dibromopropyl)ethylene diphosphate
tetrakis(2-bromoethyl)-2-butene-1,4-diphosphate A particularly preferred group of phosphate polyesters which are amenable to treatment by the method of the invention are those represented by Formula II as follows:

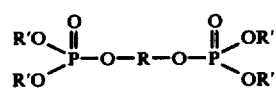
(II)

wherein
R' is a chloroalkyl radical having 1-8, and more preferably 1-4, carbon atoms, and
R is an alkylene radical having 1-8, and more preferably 1-4, carbon atoms.

Compounds which are illustrative of those represented by Formula II include tetrakis(2-chloroethyl)ethylene diphosphate, tetrakis(2-chloroisopropyl) ethylene diphosphate and tetrakis(2-chloroethyl)-2-butene-1,4-diphosphate.

According to the invention, the polyesters of Formula I are utilized as additives in flexible, semi-rigid and rigid polyurethane foam compositions. In preparing the polyurethane foams of the invention, either the so-called "one-shot method" or the "prepolymer technique" may be employed. Any combination of polyols, including polyether polyols and polyester polyols, organic polyisocyanate, polyols and polyester polyols, organic polyisocyanate, foaming agent, catalyst and other reactants capable of forming a flexible urethane foam can be employed, and the term "polyurethane foam formulation" in the specification and claims herein is intended to include the product of any such combination. Typical formulations are described in U.S. Pat. No. 3,072,582, issued Jan. 8, 1963 and Canadian Patent No. 705,938, issued Mar. 16, 1965.

While, as indicated above, both polyether and polyester polyols can be employed in the practice of this invention, preferred embodiments utilize polyether polyols in the preparation of the polyurethane foam-forming reaction mixture. Any suitable polyether polyols may be used for this purpose. These polyether polyols usually have a hydroxyl number, for example, from about 25 to about 800.

The polyether polyols include, for example, oxyalkylated polyhydric alcohols having a molecular weight range of about 200–10,000 and preferably between about 250–8,000. These oxyalkylated polyhydric alcohols are generally prepared by methods well known in the art such as reacting, in the presence of an alkaline catalyst, a polyhydric alcohol and an alkylene oxide such as ethylene oxide, propylene oxide, butylene oxide, amylene oxide, epichlorohydrin and mixtures of these alkylene oxides, using either random or step-wise addition.

Polyhydric alcohols suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohol may be replaced with another compound having at least two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylenediamine, 1,6-hexanediamine, diethylenetriamine and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid succinic acid, glutaric acid, aconitic acid, diglycollic acid and the like. It will be recognized that the reactive hydrogen compound can be one containing different functional groups having reactive hydrogen atoms, such as critic acid, glycollic acid, ethanolamine and the like. Aromatic polyamines such as toluene diamine may also be employed. Mixtures of oxyalkylated polyhydric alcohols are also suitable for use in the process of this invention.

Although, as indicated above, the polyurethane foams of the invention can be flexible, semi-rigid, or rigid, the flexible foams are preferred. Therefore, in preparing the polyurethane foam in accordance with this preferred embodiment of the invention, an oxyalkylated polyhydric alcohol is used having a molecular weight of about 2,000–7,000, and more preferably about 2,500–6,000.

The organic polyisocyanate used in the preparation of the polyurethane foams include toleune diisocyanate, such as the 4:1 by weight mixture or the 65:35 by weight mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride. Other useful foaming agents include lower molecular weight alkanes, alkenes and ethers such as methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to about 50, and preferably about 5–35, parts per 100 parts by weight of the polyol, and generally water, the use of which is preferred, is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicones and the siloxaneoxyalkylene block copolymers. U.S. Pat. No. 2,834,748 and T. H. Ferrigno, *Rigid Plastic Foams* (New York: Reinhold Publishing Corp., 1963) pages 38–42, disclose various surfactants which are useful for this purpose. Generally up to 2 parts by weight of the surfactant are employed per 100 parts of the polyol.

In utilizing the polyesters of Formula I to prepare the polyurethane foam of the invention, they are usually added to the polyurethane foam-forming reaction mixture prior to foaming. Conveniently, they are first blended with the polyol component used in making the foam and the blend is then added to the other ingredients of the polyurethane foam-forming reaction mixture. The proportion of the polyester which is used is not limited to any particular amount or range so long as its inclusion in the foam-forming reaction mixture imparts reduced combustibility characteristics to the foam without otherwise detrimentally affecting the other properties of the foam. For example, in practice, a proportion of the polyester may be used which ranges from about 2 to about 30 parts per 100 parts by weight of total polyol employed in making the foam. However, higher as well as lower proportions may be used, if desired. A particularly preferred proportion range is about 5-20 parts per 100 parts by weight of polyol.

The present invention is particularly suited for relatively high water/low density flexible foams because scorching problems are more likely to occur in these type of foams than any other. The term "high water" is usually defined in the art to mean that about 3.6-5.5 parts, preferably about 4.0-4.8 parts, by weight of $H_2O$ is employed per 100 parts by weight of polyol. And, "low density" is usually used to mean that the resultant foam has a density of about 0.7-1.6 pounds per cubic foot. It should be noted that in the production of these foams, the more water being used normally causes lower density because the water is turned to steam which escapes and leaves air pockets. And, with high water foams, scorching or discoloration is thought to occur because more heat is created in the exotherm than with lower water/higher density foams.

Generally, any amount of hydroquinone can be employed which is effective to inhibit scorching in the polyurethane foam. Preferably, a ratio of halogenated phosphate polyesters to hydroquinone from about 500:1 to about 10:1 by weight is employed. More preferably, a weight ratio ranging from about 400:1 to about 100:1 is employed, and most preferably, a weight ratio of about 200:1 is used. Too low of an effective amount of hydroquinone will result in incomplete scorching inhibition, resulting in some discoloration. On the other hand, employing too much hydroquinone over an effective amount does not cause any appreciable difference, thus, causing a waste of hydroquinone.

In utilizing the hydroquinone, this can be added to, and mixed with, the halogenated phosphate polyester before the latter's addition into the polyurethane foam formulation, or the hydroquinone can be added separately to the foam-forming reaction mixture.

The following examples are provided to illustrate the invention. In these examples, all parts and percentages given are by weight, unless otherwise specified.

EXAMPLE 1

The following formulation and method were employed for Examples 1–3 and Comparisons 1 and 2 for making a polyurethane foam.

| Formulation | Weight | |
|---|---|---|
| Polyol[1] | 100.0 | grams |
| Triethylene diamine[2] | 0.3 | grams |
| Stannous octoate catalyst[3] | 0.25 | grams |
| Silicone copolymer-stabilizer surfactant[4] | 1.5 | grams |
| Water | 4.8 | grams |
| Toluene diisocyanate[5] | 60.5 | grams |
| Tetrakis (2-chloroethyl) ethylene diphosphate | 15.0 | grams |

[1]Oxypropylated glycerol, molecular weight 3,000.
[2]DABCO 33LV, manufactured by Air Product Co. This contains 66.7% by weight dipropylene glycol.
[3]Witco C-2, manufactured by Witco Chemicals Co.
[4]DC-190, manufactured by Dow Corning Co. This surfactant is a block copolymer of polydimethylsiloxane and a polyester resin.
[5]This is a 4:1 by weight mixture of the 2,4- and 2,6-isomers of toluene diisocyanate.

All of the above ingredients with the exception of the stannous octoate and TDI are pre-weighed into a (12 oz.) paper cup (unweighed). Pre-mix these ingredients for approximately 15 seconds at constant 1750 rpm and add stannous octoate via a 1 ml hydrodermic syringe while stirring. Mix another 15 seconds and add TDI (pre-measured in a 50 ml graduated cylinder). This entire formulation is then stirred approximately 15 seconds and poured into an 8 × 8 × 4 inches cake box. After a full rise (70 to 100 seconds after TDI addition), the foam is cured at 90°–110° C in a vented oven for approximately 10 minutes, removed and cut to check for flaws.

In this example, a 500:1 weight ratio of the halogenated phosphate polyester to hydroquinone was employed (0.03 grams hydroquinone) with the above formulation. The center portion of the foam after being cut open was only slightly darkened and had a substantially uniform beige color throughout. This shows that this amount of hydroquinone was effective in inhibiting scorching.

EXAMPLE 2

The same formulation and method were used as in Example 1 except that a 200:1 weight ratio of the halogenated phosphate polyester to hydroquinone (0.075 grams) was employed with the above formulation. The slightly darkened center portion which was apparent in Example 1 had diminished in color tone to almost being negligible here, which demonstrates that this amount of hydroquinone was slightly better at inhibiting scorching than the amount in Example 1, although both were effective.

EXAMPLE 3

This example is the same formulation as Example 1 except a weight ratio of 100:1 of halogenated phosphate polyester to hydroquinone (0.15 grams) was employed. The center of the resulting foam did not have any appreciably better color than that of Example 2, showing that while this was also an effective amount, this use of an excess amount over Example 2 was not necessary.

COMPARISON 1

This comparison used no hydroquinone for making polyurethane foams from the above formulation. The center of the foam was dark brown in color as opposed to a uniform beige color throughout. This darkened color portion indicated scorching resulted.

COMPARISON 2

This was a control experiment which was made from the above formulation, but without either halogenated phosphate polyester or hydroquinone present. The resulting foam showed no scorching or discoloration.

EXAMPLE 4

The following formulation and method were employed for Examples 4-6 and Comparison 3 and 4 for making a polyurethane foam.

| Formulation | Weight | |
|---|---|---|
| Polyol[1] | 100.0 | grams |
| Dimethylamine ethyl ether[2] | 0.1 | grams |
| Stannous octoate catalyst[3] | 0.5 | grams |
| Silicone surfactant[4] | 1.0 | grams |
| Water | 4.7 | grams |
| Trichloromonofluoromethane blowing agent[5] | 3.0 | grams |
| Toluene diisocyanate[6] | 57.1 | grams |
| Tetrakis (2-chloroethyl) ethylene diphosphate | 15.0 | grams |

[1]This is a polyether triol having a molecular weight of 3,500, prepared by oxyalkylating glycerol with a random mixture of 15% ethylene oxide and 85% propylene oxide.
[2]NIAX A-1, manufactured by Union Carbide. This contains 30% by weight dipropylene glycol.
[3]Witco C-4, manufactured by Witco Chemicals Co.
[4]L-5720, manufactured by Union Carbide.
[5]Freon 11, manufactured by DuPont Corp.
[6]This is a 4:1 by weight mixture of the 2,4- and 2,6-isomers of toluene diisocyanate.

By employing a 150 lb./min. Martin-Sweets polyurethane foam-making machine, commercial-size foam buns having the dimensions 10 feet × 54 inches × 27 inches were made. The buns were observed for obvious scorching in the center after being cut in half vertically.

In this example, a 500:1 weight ratio of the halogenated phosphate polyester to hydroquinone was employed (0.03 grams hydroquinone) with the above formulation. The center portion of the foam after being cut open had only a slightly greyish discoloration. This demonstrates that this amount of hydroquinone was effective in inhibiting scorching.

EXAMPLE 5

The same formulation and method were used as in Example 6 except that a 200:1 weight ratio of the halogenated phosphate polyester to hydroquinone (0.75 grams) was employed with the above formulation. The slightly greyish center portion which was apparent in Example 6 had diminished in color tone to almost being negligible here, which shows that this amount of hydroquinone was slightly better at inhibiting scorching than the amount used in Example 1, although both were effective.

EXAMPLE 6

This example is the same formulation as Example 4 except a weight ratio of 100:1 of halogenated phosphate polyester to hydroquinone (0.15 grams) was employed. The center of the resulting foam did not have any appreciably better color than that of Example 5, showing that while this was also an effective amount, this use of an excess amount over Example 5 was not necessary.

COMPARISON 3

This comparison used no hydroquinone for making polyurethane foam from the above formulation. The center of the foam had an intense brownish discoloration in the center, indicating scorching.

COMPARISON 4

This was a control experiment which was made from the above formulation, but without either halogenated phosphate polyester or hydroquinone present. The resulting foam showed no scorching or discoloration.

What is claimed is:

1. In a method of making polyurethane foam which has reduced combustibility characteristics wherein the polyurethane foam formulation contains a halogenated phosphate polyester additive having the formula

$$RX_a[OP(OR')_2]_n$$

wherein
R is an aliphatic hydrocarbon having 1-8 atoms or an aromatic hydrocarbon radical having 6-14 carbon atoms,
X is a halogen selected from chlorine, bromine and a mixture thereof,
$a$ is an integer of 0-4,
$n$ is an integer of 2-6, and
each
R' is a haloalkyl radical having 1-8 carbon atoms, the halogen in this radical being chlorine, bromine or a mixture thereof,
wherein the improvement comprises:
adding an effective amount of hydroquinone to inhibit scorching in said foam formulation.

2. The method of claim 1 wherein the ratio by weight of said halogenated phosphate polyester additive to hydroquinone is from about 500:1 to about 10:1.

3. The method of claim 1 wherein, as applied to said formula, R represents an aliphatic hydrocarbon radical having 1-8 carbon atoms, $n$ is 2 and all the radicals represented by R' are identical.

4. The method of claim 3 wherein, as applied to said formula, X is chlorine and R' is chloroalkyl.

5. The method of claim 4 wherein said halogenated phosphate polyester is represented by the formula

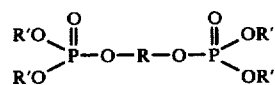

$$R'O\phantom{x}\underset{R'O}{\overset{\phantom{x}}{>}}\!\!\overset{O}{\underset{\|}{P}}\!-\!O\!-\!R\!-\!O\!-\!\overset{O}{\underset{\|}{P}}\!\!\underset{OR'}{\overset{\phantom{x}}{<}}\!\phantom{x}OR'$$

wherein
R' represents a chloroalkyl radical having 1-4 carbon atoms, and
R represents an alkylene radical having 1-4 carbon atoms.

6. The method of claim 5 wherein the ratio by weight of said halogenated phosphate polyester additive to hydroquinone is from about 500:1 to about 10:1.

7. The method of claim 5 wherein said halogenated phosphate polyester is tetrakis(2-chloroethyl)ethylene diphosphate.

8. The method of claim 5 wherein said polyurethane foam formulation comprises a polyether polyol, an organic polyisocyanate, a reaction catalyst and a foaming agent.

9. The method of claim 8 wherein said polyether polyol is an oxyalkylated polyhydric alcohol having a molecular weight range of about 200 to about 10,000.

10. The method of claim 9 wherein said foaming agent is water.

11. The method of claim 10 wherein said water is employed in an amount from about 1.0 to about 6.0 parts by weight per 100 parts by weight of said polyol.

12. The method of claim 11 wherein said halogenated phosphate polyester additive is employed in an amount from about 2 to about 30 parts by weight per 100 parts by weight of said polyol.

13. The method of claim 12 wherein said organic polyisocyanate is toluene diisocyanate and said polyurethane foam formulation contains a surfactant.

14. The method of claim 13 wherein said halogenated phosphate polyester additive is tetrakis(2-chloroethyl) ethylene diphosphate.

15. The method of claim 14 wherein said oxyalkylated polyhydric alcohol is oxypropylated glycerol, said catalyst is a mixture of a tertiary amine and a stannous salt, said toluene diisocyanate is a 4:1 by weight mixture of the 2,4- and 2,6-isomers of toluene diisocyanate, and said water is employed in amount from about 3.6 to about 5.5 parts by weight per 100 parts by weight of said polyol.

16. The method of claim 15 wherein the ratio by weight of said halogenated phosphate polyester additive to hydroquinone is from about 500:1 to about 10:1.

17. The method of claim 16 wherein said ratio by weight is from about 400:1 to about 100:1.

18. The product produced by the process of claim 1.

19. The product produced by the process of claim 5.

20. The product produced by the process of claim 17.

* * * * *